United States Patent
Heath et al.

(10) Patent No.: US 8,233,474 B2
(45) Date of Patent: Jul. 31, 2012

(54) COMMUNICATION OF LOCATION INFORMATION FOR AN IP TELEPHONY COMMUNICATION DEVICE

(75) Inventors: Gregory R Heath, Santa Clara, CA (US); Jeffrey S Wong, San Jose, CA (US)

(73) Assignee: Extreme Networks, Santa Clara, CA (US)

( * ) Notice: Subject to any disclaimer, the term of this patent is extended or adjusted under 35 U.S.C. 154(b) by 298 days.

(21) Appl. No.: 12/415,960

(22) Filed: Mar. 31, 2009

(65) Prior Publication Data

US 2010/0246439 A1    Sep. 30, 2010

(51) Int. Cl.
*H04L 12/66* (2006.01)
*H04L 12/56* (2006.01)

(52) U.S. Cl. ........................ 370/352; 370/389

(58) Field of Classification Search .................. 370/351, 370/352, 356, 389, 355; 709/223, 224, 227, 709/228
See application file for complete search history.

(56) References Cited

U.S. PATENT DOCUMENTS

| 7,130,385 | B1 | 10/2006 | Moon |
| 2007/0286178 | A1* | 12/2007 | Kakiuchi et al. ............... 370/356 |
| 2008/0276004 | A1* | 11/2008 | Thomson et al. ............. 709/244 |
| 2009/0010249 | A1* | 1/2009 | Gass ............................. 370/352 |

OTHER PUBLICATIONS

IEEE P802.1AB/D12, Draft Standard for Local and Metropolitan Networks: Station and Media Access Control Connectivity Discovery. IEEE Computer Society, Oct. 2004.
TIA Standard, Telecommunications IP Telepony Infrastructure, Link Layer Discovery Protocol for Media Endpoint Devices. ANSI/TIA-1057-2006. Apr. 6, 2006.

* cited by examiner

*Primary Examiner* — Chi Pham
*Assistant Examiner* — Feben M Haile
(74) *Attorney, Agent, or Firm* — Blakely Sokoloff Taylor & Zafman, LLP (57) ABSTRACT

Techniques for providing location information describing a communication device configured to exchange telephony information over a computer network. A switching device of the computer network receives a first message according to a node-to-node communication protocol, the first message indicating that the endpoint communication device includes a configuration for a mode of operation on behalf of a telephone service account. The switching device determines from the first message an identifier of the telephone service account and sends the determined identifier in a second message via the computer network, the second message in support of a location service.

22 Claims, 4 Drawing Sheets

COMMUNICATION OF LOCATION INFORMATION FOR AN IP TELEPHONY COMMUNICATION DEVICE

BACKGROUND OF THE INVENTION

1. Field of the Invention

The present invention relates generally to computer network communications. More particularly, certain embodiments relate to internet protocol (IP) telephony in a packet switched network.

2. Background Art

Increasingly, network mobility allows communication devices capable of IP telephony to operate on behalf of a particular telephone service account at different times from different computer network access points and/or different geographic regions. Furthermore, telephony technologies increasingly allow such communication devices to operate on behalf of different telephone service accounts at different times and/or allow a particular service account to be serviced by different communication devices at different times. Therefore, the dynamic nature of IP network telephony results in frequent changes in the association between a particular telephone service account and a geographic location of a communication device operating on behalf of that particular telephone service account.

These dynamic changes pose a problem for services such as emergency telephone number (e.g. "911") services, which rely on up-to-date geographic information to correctly dispatch emergency medical, police and/or fire services. To support access to emergency response services via IP telephony, IP networks usually rely on a central exchange—e.g. a voice over internet protocol (VoIP) private branch exchange (PBX)—which processes an IP telephony call placed to an emergency telephone number prior to sending call information on to the emergency telephone number service. Typically, the central exchange extracts from network packets of an emergency call a telephone number or other identifier of a telephone service account on whose behalf the emergency call was placed. A location service uses the extracted account identifier to retrieve geographic location information which is then included in the call to the emergency telephone number service.

Currently, updates related to certain device-specific location information are communicated in "end-to-end" data exchanges between the location service and the communication device whose location is to be determined by the location service. More particularly, these updates are exchanged via higher level communication protocols such as the Session Initiation Protocol (SIP). Operating, for example, at the Open Systems Interconnection (OSI) application layer 7, such protocols may communicate across one or more intermediary network nodes, wherein the communication device and the location service operate as a source sending and/or a destination receiving the location information update. The location service uses end-to-end communication to participate in separate respective message exchanges with each specific communication device in order to keep its location information up-to-date. As a result, the accuracy of the location service's information may, for example, be subject to temporary and/or intermittent unavailability of communication devices. Moreover, one or more intermediary network switching devices may have to relay multiple exchanges between communication devices and the location service—e.g. wherein the intermediary switching device itself does not participate in retrieving location information in response to an emergency call. Therefore, current techniques of providing location services for IP telephony may, for example, result in latent location information updates and/or network loading which reduces network performance.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Various embodiments include techniques for providing location information related to a network device which communicates with a packet-switched computer network (also referred to herein as a "computer network"). The network device may communicate with the computer network via a switching device—e.g. wherein the network device communicates directly with the switching device as an endpoint communication device, or wherein the network device communicates with the switching device on behalf of an endpoint communication device.

In certain embodiments, the above-described communications may include the network device exchanging a stream of audio and/or video data via the computer network—e.g. to implement a telephony session. The exchange of data may be debited from, attributed to, or otherwise described in terms of a specific account—such as a telephone service account—recognized by a service provider—such as a local exchange carrier (LEC)—which resources are used to implement the exchange. An endpoint communication device—e.g. the network device or a communication device on whose behalf the network device exchanges communications—may be configured so that a user's local operation of the endpoint communication device thereby accesses resources of the account.

The computer network may include a location service—e.g. any of a variety of combinations of one or more databases, servers and other network devices which gather location information for later retrieval and/or other use by a client. The location server may exchange information describing a geographic location of the endpoint communication device. Changes to the operation and/or configuration of the endpoint communication device may result in a need to update the location information of the location server. In certain embodiments, the switching device may receive a message from the network device and determine from the message update information to be sent to the location service.

The message received by the switching device may include information specifying a service account which an endpoint communication device is configured to serve. The message may be formatted according to a "node-to-node" (also known as "single hop") protocol which is at least interpreted as being directly sent from a source node—i.e. without any intermediary network nodes. The use of node-to-node protocols may allow location information to be included in a discovery message or other low level exchange between an endpoint communication device and a switching device, where the switching device can variously process and/or store the location information for later sending to a location service—e.g. along with location information for one or more other endpoint communication devices. Furthermore, use of node-to-node protocols may allow location information to be exchanged without requiring a location service to establish separate respective communication sessions with individual endpoint communication devices.

Figure 1:
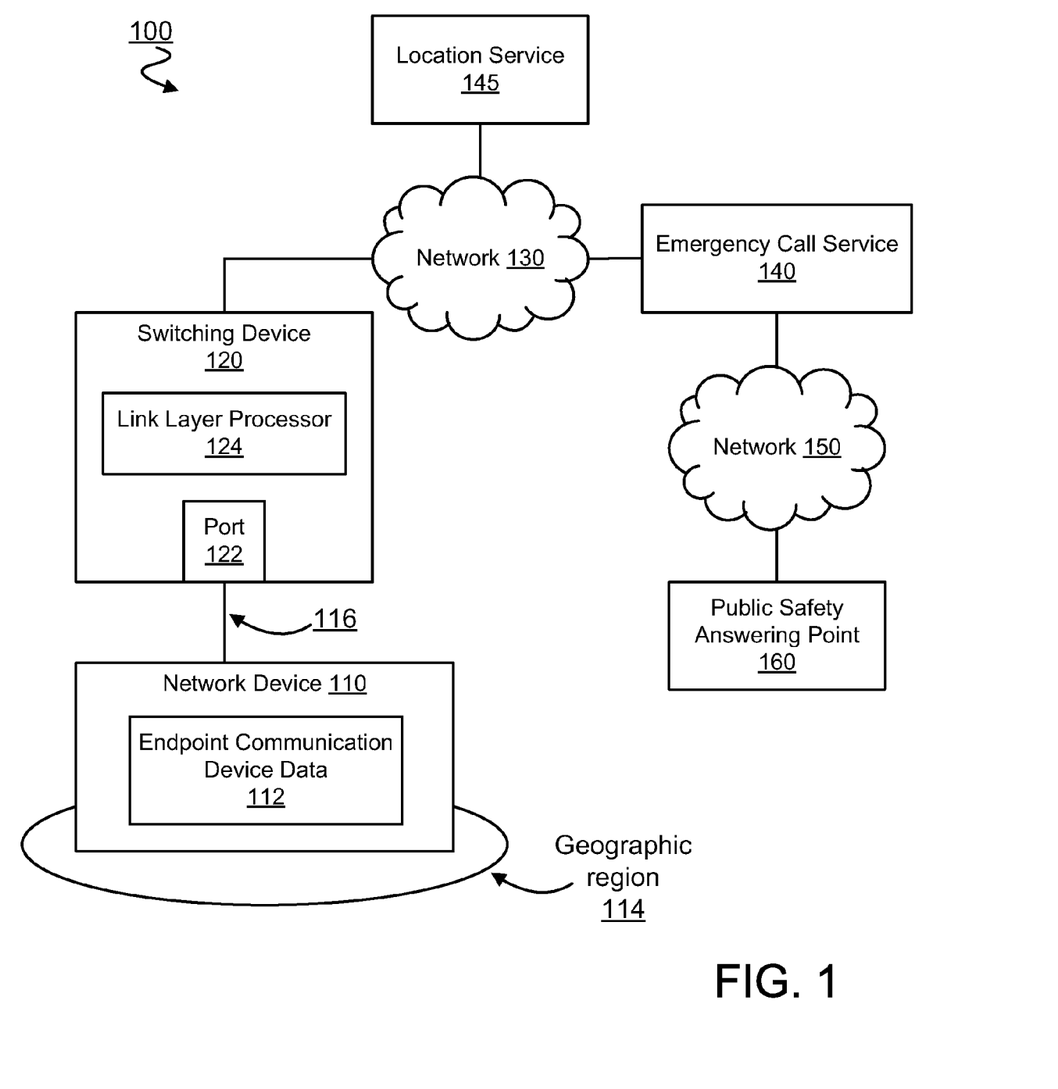
FIG. 1 is a block diagram showing select elements of a system in which location information may be exchanged according to various embodiments.

FIG. 1 shows a network 100 including a network device 110 and a switching device 120 connecting network device 110 to a packet-switched computer network 130. The network 130 may communicate voice information, such as telephony information, in data packets. In an embodiment, the computer network 130 may include one or more devices interconnected for wired communication—e.g. according to an Ethernet standard such as Institute of Electrical and Electronics Engineers (IEEE) Std 802.3ae-2002 (June, 2002). By way of illustration and not limitation, the computer network 130 may include any of a variety of combinations of public and/or private networks including one or more of an internet, a local area network (LAN), a wide area network (WAN) and a metropolitan area network (MAN).

Network device 110 may include any of a variety of devices capable of implementing voice communications over the packet-switched computer network 130. Such communications may, for example, include computer network 130 switching data packets according to an internet protocol (IP) to implement an audio and/or video stream for network device 110. These communications may include any of a variety of techniques variously known, for example, as IP telephony, Internet telephony, Voice over Internet Protocol (VoIP), Voice over Broadband (VoBB), broadband telephony and/or broadband phone. For the purpose of brevity in describing the invention, certain features of various embodiments are described herein in terms of VoIP communications. It is appreciated, however, that aspects of these embodiments can be extended to include additional or alternate techniques for implementing audio and/or video telephony information in a packet-switched computer network.

In certain embodiments, the network device 110 may include an endpoint communication device. As used herein, "endpoint" is understood to refer to a device's characteristic of lying at one end of a data path (such as a data stream of an IP telephony session) that originates and/or terminates at that device—e.g. at an application specific integrated circuit (ASIC) of the network device 110 or at a telephony application program executed by a processor of the network device 110. An endpoint communication device may, for example, include a purpose-built telephone device dedicated to providing VoIP capability. Additionally or alternatively, an endpoint communication device may include any of variety of computing devices—e.g. a personal digital assistant (PDA) or other personal computer (PC) device such as a notebook, laptop or desktop—which includes software and/or hardware capable of implementing VoIP communications. In certain embodiments, the endpoint communication device may include an ability to perform a conversion of a user's voice to and/or from switched data packets of computer network 130. In particular embodiments, network device 110 may be an endpoint communication device which is directly connected to only one other network device such as switching device 120. Operation of network device 110 as an endpoint communication device may be determined by and/or described according to various endpoint communication device data 112 stored in network device 110.

In certain embodiments, network device 110 itself may not include an endpoint IP telephony communication device, but may rather include a device—e.g. a wireless router—which connects the switching device 120 to some other device (not shown) that operates as an endpoint communication device such as described above. In some such embodiments, endpoint communication device data 112 may include data to determine and/or described operation of this other device as an IP telephony communication device. For example, endpoint communication data 112 may be information to be sent to or received from the endpoint communication device to communicate a mode of its operation on behalf of a particular telephone service account.

Certain features are discussed herein in terms of embodiments wherein the network device 110 includes an endpoint communication device and exchanges endpoint communication device data related to operation of the network device 110 as an endpoint communication device. However, it is understood that aspects of these discussed embodiments may be extended to apply to embodiments wherein network device 110 communicates endpoint communication device data 112 describing an operation of another network device as an endpoint communication device.

As an endpoint communication device, network device 110 may be configured to operate in the service of a particular account (referred to herein as a "telephone service account") which may be established, supported, managed or otherwise recognized by a telephone service provider. A telephone service provider may include a public telecommunications company—e.g. a local exchange carrier (LEC)—which sets up and/or maintains telephone subscriber accounts for private citizens, businesses, government organizations, etc. Alternately or in addition, a telephone service provider may include any of a variety of government organizations, private businesses and/or similar enterprises which set up and/or maintain their own accounts for distinguishing callers within a private telephone network used by employees, members, clients, etc. In an embodiment, a telephone service account established by one telephone service provider may nevertheless be supported, implemented or otherwise recognized by another telephone service provider.

In certain embodiments, network device 110 may be configurable/reconfigurable to operate at different times in the service of different telephone service accounts. For example, network device 110 may include parameter(s)—e.g. in endpoint communication device data 112—for variously defining/redefining a configuration of network device 110 for different modes of operation. For one configuration, network device 110 may operate in a mode which provides for telephony communication over a packet-switched network on behalf of a first telephone service account. In such a configuration, a user's local operation of network device 110 may thereby access resources of the telephone service provider which are specific to the first telephone service account. At another time with a parameter in endpoint communication device data 112 set to a different value, a different configuration may result wherein local operation of network device 110 accesses telephone service resources which are specific to a different telephone service account.

Endpoint communication device data 112 may include information which specifies, describes, or otherwise identifies a particular telephone service account. By way of illustration and not limitation, endpoint communication device data 112 may include a telephone number and/or telephone number extension uniquely assigned to a specific telephone service account. Alternatively or in addition, endpoint communication device data 112 may include a user name, login name, password and/or other identifier which specifies a particular user or users to which the telephone service account has been assigned.

It is understood that endpoint communication device data 112 may be separate from and/or independent of various network connectivity contexts within which the network device 110 may itself be recognized by computer network 130. For example, information in endpoint communication device data 112 may be distinguished from and/or independent of an address which is assigned to device 100 by computer network 130—such as an IP address—to identify network device 110 as a particular routing destination. Similarly, the information in endpoint communication device data 112 may be distinguished from and/or independent of information—such as a Media Access Control (MAC) address—used to identify network device 110 as a particular physical device of the network 100. An assigned IP address and/or a MAC address of network device 110 may persist across different modes of operation of network device 110, wherein each mode is for communication with computer network 130 on behalf of a different telephone service account.

Switching device 120 may include any of variety of switches and/or routers to switchably exchange data packets for communication between network device 110 and other devices of network 100. For example, switching device 120 may include at least one port 122—e.g. an Ethernet connection—by which devices such as network device 110 may be coupled, and communicate with, other devices of network 100. In an embodiment, switching device may include at least one of an OSI layer 2 switch and an OSI layer 3 switch.

In certain embodiments, switching device 120 may be associated with one or more pre-defined geographic regions which, for example, variously correspond to locations and/or areas of accessibility for one or more respective resources of switching device 120. By way of illustration and not limitation, a geographic region 114 may be include a location of port 122 (or of a point of access thereto 116—e.g. an Ethernet cable, an input/output jack, a modem, a wireless router) and an actual or expected range of service coverage provided by port 122 (or by the point of access thereto 116). In certain embodiments, a direct or indirect access of port 122 may be identified from and/or described according to the geographic region 114 which, before said access, has been registered in network 100 as being associated with port 122. It is understood that network 100 may include any of a variety of combinations of additional or alternate geographic regions variously associated with one or more respective resources of switching device 120. For example, geographic region 114 may represent the entire service area covered by all resources of switching device 120. Alternatively, geographic region 114 may represent only a subset of a larger geographic region (not shown) in which resources of switching device 120 are variously available.

Predefining the one or more geographic regions may include storing in the network 100 information which specifies, identifies or otherwise describes the one or more geographic regions. In certain embodiments, switching device 120 may store a geographic identifier (or GID, not shown) which identifies geographic region 114. It is understood that switching device 120 may store any of a variety of combinations of additional or alternate GIDs which describe geographic regions variously associated with some combination of one or more resources of switching device 120. A GID may include information stored in any of a variety of recognized formats including, but not limited to, the Coordinate-based Location Configuration Information (LCI) format as defined by the Internet Engineering Taskforce (IET) Request for Comments (RFC) 3825, July 2004, the Civic Addresses Configuration Information format as defined by the IET RFC 4676, issued October 2006 and the Emergency Location Identification Number (ELIN) format as defined by the National Emergency Number Association (NENA) Technical Information Document (TID) 07-501, issued June, 2004.

Network 100 may include a location service 145 to gather, provide or otherwise manage location information for retrieval or other use by a client. The client may itself be a service of network 100 such as, for example, a Public Safety Answering Point (PSAP) 160—a call center to answer calls placed to an emergency telephone number—e.g. in support of dispatching emergency medical, fire and/or police services. For example, PSAP 160 may include a call center to provide emergency services such as the 911 emergency service recognized in North America, the 112 emergency service recognized in the European Union, and/or the 119 emergency service recognized in various Asian countries. Computer network 130 may exchange data packets to implement a VoIP call which is placed to an emergency telephone number of PSAP 160. Emergency call service 140 may process data packets to generate information to be sent to PSAP 160—e.g. via a network 150. In an embodiment, network 150 includes a circuit-switched network such as a public switched telephone network (PSTN). Although features of certain embodiments are discussed herein in terms of providing location services in support of emergency telephone services, it is appreciated that concepts described herein may be extended to apply to any of a variety of other services (e.g. network administration, internet security services, etc.) which may retrieve or otherwise use geographic location information managed by a location service 145.

According to various regulations and standards for emergency response systems, an emergency call received at PSAP 160 may be required to include information describing a geographic location associated with the originator of the emergency call. More particularly, certain data implementing an emergency call to PSAP 160 via computer network 130 may be required to include a GID prior to the data being received by PSAP 160. Including a GID may account for the possibility of a recent change in how a particular telephone service account is associated with a particular geographic region. For example, network device 110 may have recently moved from accessing computer network 130 from a previous geographic region (not shown) to accessing computer network 130 from the geographic region 114 defined as being associated with port 122. Alternately or in addition, network device 110 may be reconfigured at different times for local operation on behalf of a different telephone service to accesses computer network 130 from geographic region 114 via port 122. Such dynamic changes to the operation of network device 110 result in a changed association of a particular telephone service account with a particular geographic region.

Network 100 may include mechanisms to track changes to the associations of telephone service accounts with geographic regions. For example, PSAP 160 may rely upon a network device such as emergency call service 140—e.g. one or more databases, servers and/or other network device capable of maintaining, storing, retrieving and/or otherwise providing information describing a relationship between a particular telephone service account and a geographic location of a communication device operating on behalf of that telephone service account.

In an embodiment, emergency call service 140 may include a PBX or other central service through which VoIP calls to an emergency telephone number must be processed if, for example, they are sent to PSAP 160 via computer network 130 (or some sub-network thereof). In response to an emergency call from network device 110, for example, emergency call service 140 may retrieve location information which is maintained by a location service 145. Although shown separately, it is understood that, in various embodiments, location service 145 may be included in emergency call service 140.

Location service 145 may retrieve the requested location information using one or more lookup operations to access information which, for example, variously maps (1) telephone numbers to respective addresses (e.g. Media Access Control addresses) of communication devices registered as being associated with the telephone numbers, (2) communication device addresses to respective network access points—e.g. switch/port combinations—which are registered as servicing the communication devices, and/or (3) network access points to respective geographic regions registered as being serviced by the network access points. It is understood that any of a variety of additional or alternate combinations of mappings of location information may be used by location service 145.

Correct operation of emergency call service 140 may rely on the location service 145 having accurate data to correctly map or otherwise correspond various types of location information with one another. To maintain location information up-to-date, location service 145 may conduct message exchanges with various devices which have detected recent changes in network 100.

Figure 2:
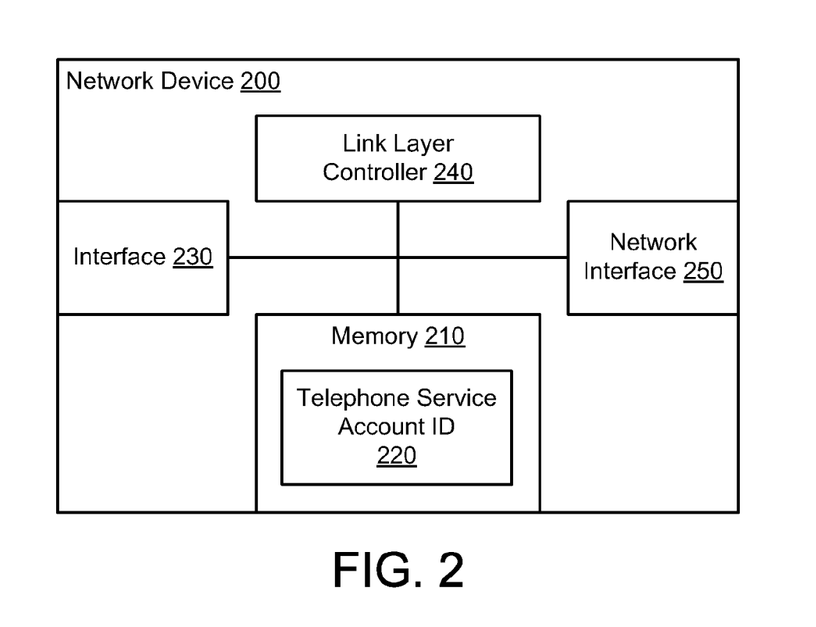
FIG. 2 is a block diagram showing select elements of a communication device to exchange location information according to various embodiments.

FIG. 2 illustrates select elements of a network device 200 to exchange location information according to embodiments of the invention. In certain embodiments, network device 200 may include one or more features discussed herein with respect to network device 110. Network device may include a memory 210 to store a telephone service account ID 220 which specifies, describes or otherwise identifies a telephone service account. In an embodiment wherein network device 200 includes an endpoint IP telephony communication device, telephone service account ID 220 may include a phone number, extension, login name or other identifier which, for example, uniquely identifies a telephone service account for which network device 200 is itself configured to operate. For example, telephone service account ID 220 may determine and/or reflect that network device 200 is configured so that local operation of network device 200—e.g. direct physical manipulation of the network device 200 by a local user—avails of resources of a telephone service provider which are assigned specifically to the identified telephone service account. In an embodiment wherein network device is not itself an endpoint IP telephony communication device, telephone service account ID 220 may store an identifier of a telephone service account for which another network device (not shown) is configured to operate as an endpoint IP telephony communication device.

Network device 230 may include an interface 230 to receive input for generating the telephone service account ID 220 stored in memory 210. In an embodiment wherein network device 200 includes an endpoint IP telephony communication device, interface 230 may include, for example, a keyboard, keypad, touch screen, graphical user interface or other such user interface to receive a user input assigning an account-specific configuration for operation of network device 200. In an embodiment wherein network device is not itself an endpoint IP telephony communication device, interface 230 may include, for example, an antenna or similar receiver to receive a message from another network device (not shown) configured to operate as an endpoint IP telephony communication device, wherein the network device 200 may generate the telephone service account ID 220 stored in memory 210 based on the received message.

Network device 200 may include a link layer controller 240 to access the stored telephone service account ID 220 and to generate a message based on the accessing. In an embodiment, the generated message may indicate that an endpoint communication device—e.g. network device 200 or another network device (not shown) connected thereto—includes a configuration for local operation of the endpoint communication device on behalf of the identified telephone service account. For example, the local operation of the endpoint communication device may be for a user associated with the telephone service account to exchange telephony information such as VoIP data over the packet-switched computer network. Link Layer controller 240 may include any of a variety of combinations of hardware and/or software controlling means including, but not limited to an application program executed by a data processor, an ASIC, a state machine, and/or firmware.

In certain embodiments, link layer controller 240 may control a network interface 250 of the network device 200—e.g. to have network interface 250 send the generated message according to a protocol limited to communication across a single network link. Network interface 250 may include an Ethernet port or any of a variety of other interface connections to couple network device 200 to a switching device. For example, the message generated by link layer controller 240 and sent via network interface 250 may communicate a configuration of an endpoint communication device according to a node-to-node (also known as "single hop") protocol. As used herein, "node-to-node" or "single hop" refers to the characteristic of a communications protocol which is dedicated to communications that are at least interpreted as being between directly connected network nodes—e.g. without any intermediary network nodes. For example, by virtue of the node-to-node protocol itself, a message formatted according to the node-to-node protocol may be interpreted as being exchanged across only a single network link. Such a protocol may include, for example, a network communication protocol for the data link layer 2 of the Open Systems Interconnection (OSI) model, or for the link layer of the Internet Protocol Suite model. It is appreciated that various technologies may allow an intermediary node to violate or circumvent a node-to-node protocol—e.g. by relaying the node-to-node communications between a source node and a destination node. For such technologies, these intermediary node may be "transparent" to a source and/or destination node, which interprets the node-to-node communications as direct source/destination exchanges spanning only a single network link.

For example, link layer controller 240 may include functionality to generate and/or exchange messages according to the Link Layer Discovery Protocol (LLDP) defined in the IEEE standard 802.1AB-2005 of May 2005. More particularly, link layer controller 240 may include functionality for network device 200 to communicate according to certain extensions to the IEEE 802.1AB protocol which are set forth in the Link Layer Discovery Protocol for Media Endpoint Devices (LLDP-MED) Standard TIA-1057 of the Telecommunications Industry Association (issued April, 2006).

Figure 3:
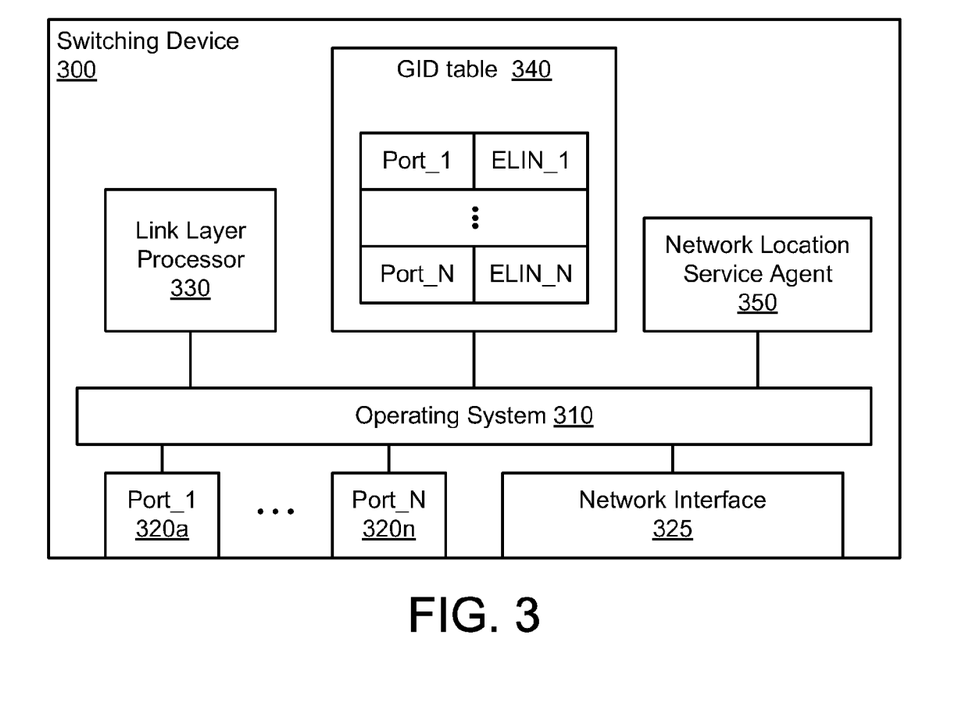
FIG. 3 is a block diagram showing select elements of a communication device to exchange location information according to various embodiments.

FIG. 3 illustrates select elements of a switching device 300 to exchange location information according to various embodiments. Switching device 300 may, for example, include one or more features discussed herein with respect to switching device 120. Switching device 300 may include one or more ports—e.g. Port_1 320a, ... Port_N 320n—to connect to communication device 200 and/or any of a variety of additional or alternative network devices—e.g. VoIP-capable endpoint communication devices.

Switching device 300 may be able to receive a message including location information associated with an endpoint communication device. For example, switching device may include an operating system 310 such as the ExtremeXOS® network operating system of Extreme Networks™ to control the switching of packets to/from endpoint communication devices—e.g. via various OSI layer 2 and/or layer 3 control protocols. Operating system 310 may include or otherwise have access to a link layer processor 330 with functionality to exchange messages according to a node-to-node protocol—e.g. a protocol which is compatible with an LLDP protocol. In various embodiments, link layer processor 330 may be able to extract or otherwise determine from such a message an account identifier specifying a telephone service account. For example, switching device 300 may receive a data packet via one of Port_1 320a, ... Port_N 320n and identify an account identifier in a field of the data packet which is compatible with the LLDP-MED extended protocol.

Port_1 320a, ... Port_N 320n may be associated with respective pre-defined geographic regions (not shown). For example, of Port_1 320a, ... Port_N 320n may each be directly and/or indirectly accessed from within respective geographic regions. These geographic regions may be specified by ELIN numbers—e.g. ELIN_1, ... , ELIN_N—or according to any of a variety of alternate geographic identification conventions. In certain embodiments, switching device 300 may further store one or more geographic identifiers (GIDs)—e.g. in a GID table 340. Each entry of GID table 340 may represent a respective one or more ports of switching device 300. For example, each entry may include an identifier of represented one or more ports (e.g. "Port_", ... "Port_N") and a geographic identifier (e.g. "ELIN_1", ... , "ELIN_N") specifying a geographic region serviced by the represented one or more ports.

Switching device 300 may send a message including the account identifier determined by link layer processor 330—e.g. via a network interface 325—to a computer network such as network 130 in support of a location service having characteristics such as those discussed above with respect to location service 145. Network location service agent 350 may include any of a variety of combinations of software and hardware means to coordinate a communication of location information to a location service.

Coordinating the communication of location information to a location service may include network location service agent 350 directly or indirectly assuring that the determined account identifier is sent to the location service according to any of a variety of communication protocols including, but not limited to, an end-to-end network communication protocol. As used herein, an end-to-end network protocol refers to a protocol capable of communicating information from a source network node across one or more intermediate network nodes to a destination network node. An end-to-end protocol may, for example, include a protocol of the OSI model which is at or above the network layer 3 and/or a protocol of the Internet Protocol Suite model which is at or above the Internet layer. In particular embodiments, switching device 300 may send location information including the determined account identifier according to a protocol compatible with one of a Simple Object Access Protocol and a Dynamic Host Configuration Protocol Although features of switching device 300 are illustrated herein in terms of functionally distinct operating system 310, link layer processor 330 and network location service agent 350, it is appreciated that their respective functionalities may be integrated in any of a variety of combinations of hardware and/or software. For example, some or all of the functionality of operating system 310, separate link layer processor 330 and network location service agent 350 may be variously integrated in a combination of one or more of an application program executing on a processor, an ASIC, firmware, a state machine, a field programmable gate array (FPGA) and/or similar computing means.

Figure 4:
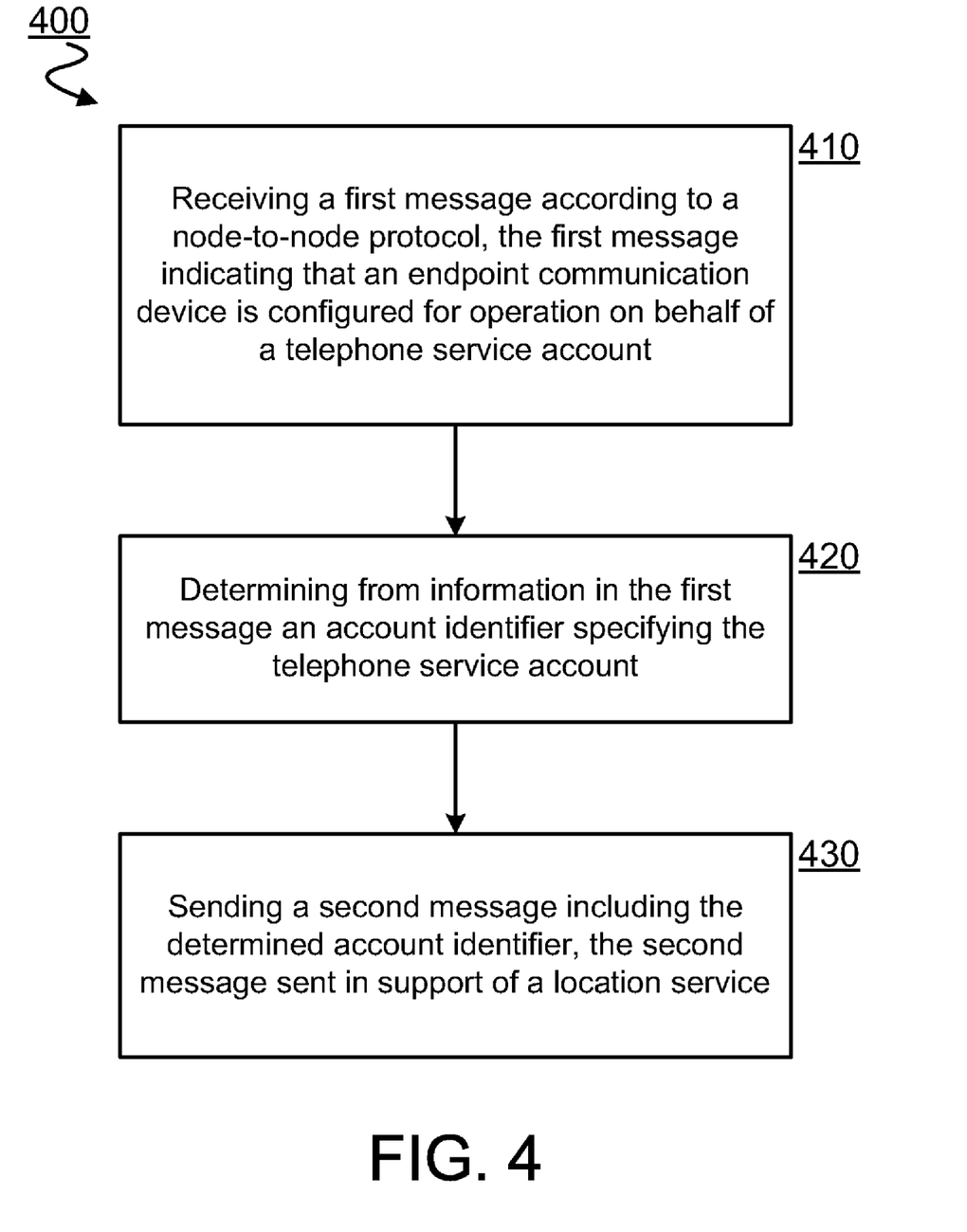
FIG. 4 is a block diagram showing an algorithm for exchanging location information according to various embodiments.

FIG. 4 illustrates select elements of an algorithm 400 for communicating location information according to an embodiment of the invention. Algorithm 400 may be performed in a network having some or all of the characteristics of network 100, for example. In an embodiment, algorithm 400 may be performed by switching device 120.

Algorithm 400 may include, at 410, receiving a first message according to a node-to-node protocol—e.g. wherein, by virtue of the node-to-node protocol itself, the first message is interpreted as communicating across only a single network link—the first message indicating that an endpoint communication device is configured for operation on behalf of a telephone service account. The first message may be sent to a switching device by a network device which is configured for operation as an endpoint communication device for a VoIP telephony session. Alternatively, the first message may be sent by a device such as a transparent intermediary node communicating location information received from such an endpoint communication device.

In response to receiving the first message, a switching device may, at 420, determining from information in the first message an account identifier specifying the telephone service account. Further in response to the first message, the switching device may, at 430, send a second message including the determined account identifier, the second message sent in support of a location service. The second may be sent from the switching device in a format according to, or compatible with, an end-to-end protocol. In various embodiments, the location service may collect, provide, or otherwise manage location information for later retrieval and/or use by a client thereof. A location service client may include, for example, a PSAP 160, emergency call service 140, and/or any of a variety of network administration or network security services which retrieve or otherwise use geographic location information.

In certain embodiments, the switching device may store information—e.g. GID table 340—describing an association of a port of the switching device with a geographic region having an access to the port. In such embodiments, the switching device may further respond to the first message by determining from the stored information a geographic identifier specifying the geographic region. For example, the switching device may identify a port by which the first message was received and use the identified port to access an entry of the GID table 340. From information representing the identified port, the switching device may then determine a geographic identifier specifying a geographic region having access to the port.

In certain embodiments, the second message may include the determined geographic identifier in the second message, e.g. to specify to a location service that the specified geographic location is associated with the telephone service account. For example, the second message may specify to the location service that the telephone service account is serviced by a communication device within the specified geographic region. This information may be made available by the location service to a client—e.g. an emergency call service which may process any subsequent emergency call from the endpoint communication device.

Figure 5:
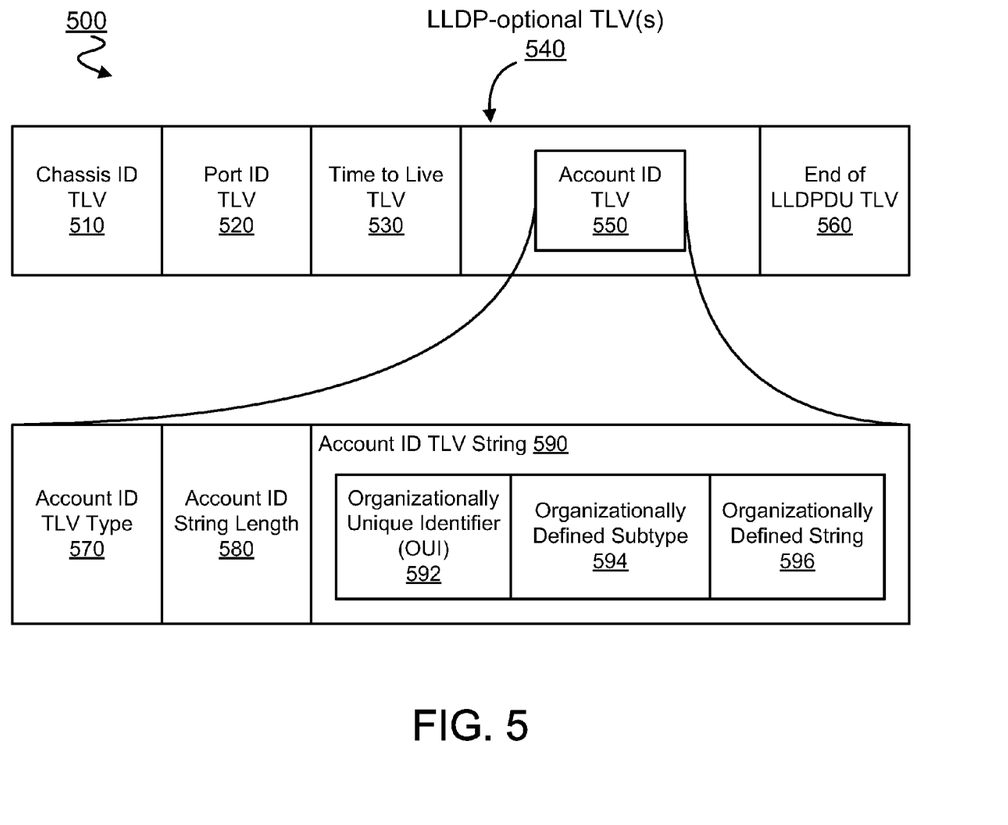
FIG. 5 is a block diagram illustrating select elements of a data packet for communicating location information according to various embodiments.

FIG. 5 illustrates select elements of a data packet 500 for exchanging location information according to certain embodiments of the invention. Data packet 500 may, for example, be a packet sent by network device 110 and/or received by switching device 120. In certain embodiments, data packet 500 may includes a format compatible with a node-to-node protocol such as LLDP—e.g. a LLDP data unit (LLDPDU) format including a number of type-length-value (TLV) fields recognized by the IEEE 802.1AB standard. Data packet 500 may include certain TLV fields which are mandatory for LLDP communication, including a chassis ID TLV 510 and Port ID TLV 520 to identify a device/port combination for the device transmitting the LLPDU. Data packet 500 may further include a Time to Live TLV 530 representing a period of validity of data in the LLDPDU. Furthermore, data packet 500 may include an End of LLDP data unit (LLDPDU) TLV 560 indicating the end of the LLDPDU.

Data packet 500 may further include TLV(s) which may be allowed optionally under the LLDP standard—e.g. LLDP-optional TLV(s) 540 having an account ID TLV 550 to communicate an account identifier as described herein. In certain embodiments, account ID TLV 550 may include an account ID TLV type field 570 to indicate that the account ID TLV 550 is a type of TLV which may include an account identifier. Additionally, account ID TLV 550 may include an account ID string length field 580 to indicate the size of account ID TLV 550. Account ID TLV 550 may further include an account ID TLV string 590 including a payload of account identifier information. It is understood that account ID TLV 550 may include any of a variety of additional or alternative data fields and/or formats.

Account ID TLV string 590 is illustrated as including an organizationally unique identifier (OUI) field 592 for identifying a particular organization and/or a particular TLV format established or used by the identified organization. OUI field 592 may, for example, enable a switching device receiving data packet 500 to determine how the account ID TLV string 590 is to be read and/or operated upon. Account ID TLV string 590 may further include an organizationally defined subtype field 594 to more specifically categorize information in the account ID TLV string 590—e.g. according to a taxonomy established or recognized by the organization identified by the OUI field 592.

Account ID TLV string 590 may further include an organizationally defined string 596 having an account identifier specifying a telephone service account which an endpoint communication device is configured to operate on behalf of. The endpoint communication device may be the network device which transmits the data packet 500. Alternately, data packet 500 may be sent from another network device—e.g. a wireless router or "transparent" intermediary device—in communication with the endpoint communication device. The data packet may include information to resolve which type of device has sent the data packet 500—e.g. an endpoint communication device or some intermediary network node on behalf of the endpoint communication device. Such resolution may be provided, for example, by information in organizationally defined subtype field 594 and/or organizationally defined string field 596. It is understood that account ID TLV string field 590 may include any of a variety of additional or alternative data fields and/or formats.

Techniques and architectures for network communication are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
receiving a first message at a switching device of a network including a packet-switched computer network, the first message received according to a node-to-node protocol for communication across only a single network link, the first message indicating a change of an endpoint communication device of the network from a first configuration for local operation of the endpoint communication device on behalf of a first telephone service account to a second configuration for local operation of the endpoint communication device on behalf of a second telephone service account, the local operation on behalf of the second telephone service account for communicating telephony information over the packet-switched computer network; and
in response to receiving the first message,
the switching device determining from information in the first message an account identifier specifying the second telephone service account, and
sending from the switching device a second message including the determined account identifier, the second message sent in support of a location service.

2. The method of claim 1, further comprising:
at the switching device, storing information describing an association of a port of the switching device with a geographic region having an access to the port; and
wherein the second message specifies an association of the geographic region with the second telephone service account.

3. The method of claim 2, wherein the first message is received via the port, the method further comprising
in response to the first message, the switching device further determining from the stored information a geographic identifier specifying the geographic region; and
wherein the second message specifying the association of the geographic region with the second telephone service account includes the second message further having the determined geographic identifier.

4. The method of claim 1, wherein the first message is sent by the endpoint communication device.

5. The method of claim 1, wherein the first message is sent by a wireless router in communication with the endpoint communication device.

6. The method of claim 1, wherein the node-to-node protocol of the first message is compatible with a Link Layer Discovery Protocol.

7. The method of claim 1, wherein sending the second message in support of a location service includes sending the second message to the location service, wherein an emergency call service retrieves information from the location service in response to the packet-switched computer network exchanging data for a call to an emergency telephone number of a public safety answering point.

8. The method of claim 1, wherein the second message is sent from the switching device according to an end-to-end protocol for communicating across one or more intermediate network devices to a destination device.

9. A switching device comprising:
a port to receive a first message from a network including a packet-switched computer network, the first message received according to a node-to-node protocol, wherein the first message is interpreted as being communicated across only a single network link, the first message indicating a change of an endpoint communication device of the network from a first configuration for local operation of the endpoint communication device on behalf of a first telephone service account to a second configuration for local operation of the endpoint communication device on behalf of a second telephone service account, the local operation on behalf of the second telephone service account for communicating telephony information over the packet-switched computer network;
a link layer processor including circuitry responsive to the first message to determine from information in the first message an account identifier specifying the second telephone service account; and
a network interface responsive to the first message to send from the switching device a second message including the determined account identifier, the second message sent in support of a location service.

10. The switching device of claim 9, further comprising
a memory to store information describing an association of the port with a geographic region having an access to the port; and
wherein the second message specifies an association of the geographic region with the second telephone service account.

11. The switching device of claim 10, wherein the link layer processor further responsive to the first message to determine from the stored information a geographic identifier specifying the geographic region, and wherein the second message specifying the association of the geographic region with the second telephone service account includes the second message further having the determined geographic identifier.

12. The switching device of claim 11, wherein the geographic identifier is compatible with one of a Coordinate-based Location Configuration Information format, a Civic Addresses Configuration Information format, and an Emergency Location Identification Number format.

13. The switching device of claim 10, wherein the memory storing information describing the association of the port with the geographic region includes the memory storing a table including one or more entries of geographic information, each entry representing a respective one or more ports of the switch, each entry including:
an identifier of represented one or more ports, and
a geographic identifier specifying a geographic region serviced by the represented one or more ports.

14. The method of claim 9, wherein the network interface sending the second message includes sending the second message according to an end-to-end protocol for communicating across one or more intermediate network devices to a destination device.

15. A machine-readable storage medium having stored thereon instructions which when executed cause a machine to perform a method comprising:
receiving a first message at a switching device of a network including a packet-switched computer network, the first message received according to a node-to-node protocol, the first message indicating a change of an endpoint communication device of the network from a first configuration for local operation of the endpoint communication device on behalf of a first telephone service account to a second configuration for local operation of the endpoint communication device on behalf of a second telephone service account, the local operation on behalf of the second telephone service account for communicating telephony information over the packet-switched computer network; and in response to receiving the first message,
the switching device determining from information in the first message an account identifier specifying the second telephone service account, and
sending from the switching device a second message including the determined account identifier, the second message sent in support of a location service.

16. The machine-readable storage medium of claim 15, the method further comprising
at the switching device, storing information describing an association of a port of the switching device with a geographic region having an access to the port; and
wherein the second message specifies an association of the geographic region with the second telephone service account.

17. The machine-readable storage medium of claim 16, wherein the first message is received via the port, the method further comprising
in response to the first message, the switching device further determining from the stored information a geographic identifier specifying the geographic region; and
wherein the second message specifying the association of the geographic region with the second telephone service account includes the second message further having the determined geographic identifier.

18. The machine-readable storage medium of claim 15, wherein the first message is sent by one of the endpoint communication device and a wireless router in communication with the endpoint communication device.

19. The machine-readable storage medium of claim 15, wherein the second message is sent from the switching device according to an end-to-end protocol for communicating across one or more intermediate network devices to a destination device.

20. The machine-readable storage medium of claim 15, wherein the node-to-node protocol of the first message is compatible with a Link Layer Discovery Protocol.

21. A network device comprising:
a memory to store an account identifier specifying a telephone service account associated with an endpoint device of a network;
a link layer controller coupled to the memory, the link layer controller including circuitry to access the account identifier and to generate a message based on the accessed account identifier, the message indicating a change of an endpoint communication device from a first configuration for local operation of the endpoint communication device on behalf of a first telephone service account to a second configuration for local operation of the endpoint communication device on behalf of a second telephone service account, the local operation on behalf of the second telephone service account for communicating telephony information over the packet-switched computer network; and
a network interface coupled to the link layer controller, the network interface to send the message to a switching device of the network, including sending the message according to a node-to-node protocol for communication across only a single network link.

22. The network device of claim 21, wherein the network device is the endpoint communication device.

* * * * *